US011811173B2

(12) United States Patent
Dimitrov

(10) Patent No.: US 11,811,173 B2
(45) Date of Patent: Nov. 7, 2023

(54) ELECTRICAL POWER CORD WITH INLINE GROUND FAULT CIRCUIT INTERRUPTER

(71) Applicant: Avellina Enterprises, LLC, Cedar Falls, IA (US)

(72) Inventor: Youri K. Dimitrov, Cedar Falls, IA (US)

(73) Assignee: Avellina Enterprises, LLC, Cedar Falls, IA (US)

( * ) Notice: Subject to any disclaimer, the term of this patent is extended or adjusted under 35 U.S.C. 154(b) by 0 days.

(21) Appl. No.: 17/652,788

(22) Filed: Feb. 28, 2022

(65) Prior Publication Data

US 2023/0275377 A1 Aug. 31, 2023

(51) Int. Cl.
*H02H 3/00* (2006.01)
*H01R 13/713* (2006.01)
*H01R 13/717* (2006.01)
*H01H 83/04* (2006.01)

(52) U.S. Cl.
CPC ......... *H01R 13/7135* (2013.01); *H01H 83/04* (2013.01); *H01R 13/7175* (2013.01)

(58) Field of Classification Search
CPC ...... H01R 13/7135; H01R 11/00; H02H 3/00; H02H 3/162; H02H 3/26; G08B 21/00
USPC ............................................................ 361/42
See application file for complete search history.

(56) References Cited

U.S. PATENT DOCUMENTS

| | | | | | |
|---|---|---|---|---|---|
| 4,532,569 | A * | 7/1985 | Salcedo | H02H 11/002 | 361/84 |
| 5,786,971 | A * | 7/1998 | Chan | H02H 3/347 | 361/45 |
| 8,203,308 | B1 * | 6/2012 | Guo | B60L 3/0069 | 361/101 |
| 2007/0121260 | A1 * | 5/2007 | Sullivan | H01H 83/04 | 361/42 |
| 2008/0112098 | A1 * | 5/2008 | Stone | H02H 9/044 | 361/111 |
| 2011/0141635 | A1 * | 6/2011 | Fabian | H02H 5/042 | 361/45 |
| 2012/0249067 | A1 * | 10/2012 | Hein | B60L 3/0069 | 320/109 |
| 2014/0094046 | A1 * | 4/2014 | Lamb | H01R 13/62 | 439/152 |
| 2019/0073884 | A1 * | 3/2019 | Payne | G08B 29/20 | |
| 2020/0108819 | A1 * | 4/2020 | Revach | B60W 20/13 | |

* cited by examiner

*Primary Examiner* — Danny Nguyen
(74) *Attorney, Agent, or Firm* — McDonnell Boehnen Hulbert & Berghoff LLP

(57) ABSTRACT

Example embodiments relate to power cords for electrically connecting one or more devices to an electrical source. A power cord may include a first end configured to couple to an electrical source and a second end configured to electrically couple to a device. A ground fault circuit interrupter (GFCI) may be coupled to the power cord between the first end and the second end such that the GFCI is configured to control a flow of electricity through the power cord to the device when the second end of the power cord is electrically coupled to the device. The GFCI may include a set of light emitting diodes (LEDs) with a first LED configured to illuminate when the GFCI is preventing the flow of electricity, and wherein a second LED is configured to illuminate when an output side of the GFCI is outputting electricity.

19 Claims, 3 Drawing Sheets

ELECTRICAL POWER CORD WITH INLINE GROUND FAULT CIRCUIT INTERRUPTER

FIELD OF THE INVENTION

The present invention relates generally to electrical power cords and, more particularly, to electrical power cords with one or more inline ground fault circuit interrupters (GFCIs) configured to operate using light emitting diodes (LEDs) notifications.

BACKGROUND

An electrical power cord, also referred to as a power cable or power cord, is a physical cable used for the transmission and distribution of electrical energy. The power cord may serve to connect an appliance or another type of device to an electrical outlet or another source of electricity. For instance, power cords are used to connect computers, refrigerators, fans, lamps, and other types of devices to electrical outlets.

A power cord is often made out of three main components: a conductor, a dielectric, and a sheath. The conductor provides a path for current to travel from an electrical source. The conductor within a power cord is frequently copper or aluminum that each have useful electrical conductivity properties. The dielectric, also referred to as insulation, withstands the service voltage and isolates the conductor from other objects. The dielectric is typically a material that has a high insulation resistance and high dielectric strength to prevent leakage current from passing through it. In addition, the dielectric often includes good mechanical strength, a low power factor, low thermal resistance, and can operate at high temperatures. The sheath prevents moisture and other external elements from entering and impacting the performance of the power cable.

SUMMARY

The present disclosure describes example embodiments relating to electrical power cords designed with one or more GFCIs that can provide control over power flow through a given electrical cord. In addition to enabling electricity to flow from a power source to one or more connected devices, an example power cord may leverage one or more GFCIs that can stop the flow of electricity to a given connected device and provide additional protection for the devices when needed. GFCIs can include one or more LEDs that can illuminate in specific ways to represent power flow information. In some embodiments, a power cord may also include a communication interface that can communicate with external devices, which can enable distribution of usage information and remote control of each GFIC.

In a first example embodiment, a power cord for electrically coupling one or more devices to an electrical source is described. The power cord includes a first portion. A first end of the first portion is configured to couple to the electrical source. The power cord also includes a splitter having an input and an output. A second end of the first portion is coupled to the input of the splitter. The power cord also includes a second portion. A first end of the second portion is coupled to the output of the splitter and a second end of the second portion is configured to electrically couple to a first device. The power cord also includes a third portion. A first end of the third portion is coupled to the output of the splitter and a second end of the third portion is configured to electrically couple to a second device. The power cord also includes a set of ground fault circuit interrupters (GFCIs). A first GFCI is coupled to the second portion between the first end and the second end of the second portion such that the first GFCI is configured to control a flow of electricity through the second portion to the first device when the second end of the second portion is electrically coupled to the first device, and a second GFCI is coupled to the third portion between the first end and the second end of the third portion such that the second GFCI is configured to control the flow of electricity through the third portion to the second device when the second end of the third portion is electrically coupled to the second device.

In a second example embodiment, an apparatus is disclosed. The apparatus includes a power cord having a first end and a second end. The first end is configured to couple to an electrical source and the second end is configured to electrically couple to a device. The apparatus also includes a ground fault circuit interrupter (GFCI) where the GFCI is coupled to the power cord between the first end and the second end such that the GFCI is configured to control a flow of electricity through the power cord to the device when the second end of the power cord is electrically coupled to the device. The GFCI includes a set of light emitting diodes (LEDs). A first LED is configured to illuminate when the GFCI is preventing the flow of electricity and a second LED is configured to illuminate when an output side of the GFCI is outputting electricity.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
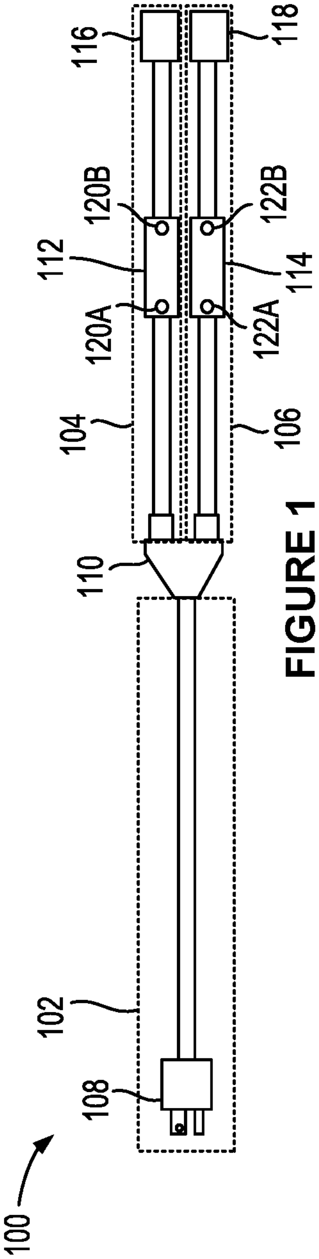
FIG. 1 illustrates a power cord, according to one or more example embodiments

The following detailed description describes various features and functions of the disclosed systems and methods with reference to the accompanying Figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the Figures may be used in combination with one another. Thus, the Figures should be generally viewed as component aspects of one or more overall implementations, with the understanding that not all illustrated features are necessary for each implementation. Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

A GFCI, also referred to as a residual current device (RCD), is a type of circuit breaker designed to shut off electric power when the GFCI senses an imbalance between the outgoing and incoming current. In practice, a GFCI can provide protection from electric shocks that can be caused by an electrical fault, such as a short circuit, insulation failure, or equipment malfunction. Standard circuit breakers are generally designed to shut off power when the current is too high (e.g., 10-20 amps), but some studies have shown that 0.030 amps of current through a person can cause paralysis of skeletal muscles and stop the person's heart. This differs from a GFCI, which can be configured to break the current circuit upon detection of a much smaller amp imbalance (e.g., 0.005 amps) to provide additional safety when compared to standard circuit breakers. Thus, a GFCI can help prevent current from traveling through a person by shutting off electrical flow upon detecting the electrical fault.

While circuit breakers are typically used to protect wires and receptacles of a building from overheating and fire, GFCIs can be incorporated in electrical outlets in bathrooms, kitchens, and other locations where electrical devices are used and a person plugging in devices into outlets may be in contact with the floor or metal fixtures that might provide an alternate path for current to travel in the case of an electrical fault. A GFCI can be used to prevent fires from short circuits and other electrical faults, such as a low current shot where the current never reaches the trigger point for a corresponding circuit breaker. As a result, GFCIs are frequently used as part of an electrical outlet to provide an additional safety mechanism that can supplement the circuit breakers of the building.

Example embodiments presented herein relate to electrical power cords designed with one or more inline GFCIs and the techniques for using example power cords described herein. Example power cords can connect one or more appliances or another type of electrical devices to an electrical source and may include one or more inline GFCIs. When positioned inline (i.e., as part of the power cord), a GFCI may be placed between the ends of the power cord in a way that enables the GFCI to shut off electrical power flowing through the power cord. The power cord with the GFCI inline may be built as part of the appliance or may serve as an extension cord connecting the power cord of the appliance to the electrical outlet.

In some example embodiments, a power cord may include multiple portions coupled together via a splitter. By using a splitter, the power cord can connect to an electrical source (e.g., plug into an electrical outlet) and simultaneously deliver electrical power from the electrical source to multiple devices connected to the source via the power cord. The power cord may include one or more inline GFCIs that can be used to prevent issues that can arise from an electrical fault.

In some configurations, a single GFCI may be positioned in the portion of the power cord between the connection to the electrical source (e.g., the plug of the power cord) and the splitter. When a GFCI is located in this position, the GFCI may serve as a global shut off that can stop the flow of electrical power to all of the devices currently connected to and obtain power via the power cord. For example, when multiple devices are connected to an electrical source via the power cord, a GFCI positioned inline the power cord at a location between the electric source and the splitter may detect an imbalance between the outgoing and incoming current relative to one or both devices and responsively shut off electrical power from further flowing through the power cord to the devices.

In another embodiment, the power cord may include multiple inline GFCIs. For instance, each portion of the power cord that extends from the splitter to the end plugs of the power cord may include a GFCI. This way, part of the power cord may be temporarily prevented from delivering electrical power to a connected device while the other part or parts of the power cord can still deliver electrical power to other connected devices. Other arrangements of inline GFCIs are possible within example power cords.

In addition to providing protection against different types of electrical faults, a GFCI can further include one or more LEDs that can be used to represent usage information associated with the power flow through the power cord. Usage information can indicate whether a GFCI is open and enables flow through it or tripped to prevent power flow to a connected device. In addition, the usage information can also indicate if power flow is reaching the GFCI in general. When power flow is not reaching the GFCI, this may indicate that the power could not be plugged into an electrical source and/or an issue with the electrical source.

In some embodiments, a GFCI positioned inline of a power cord may include two or more LEDs that can be used individually and/or in combination to represent usage information to a user. For example, a first LED can be used to indicate if the GFCI is preventing power flow through the GFCI to a coupled device while a second LED is used to indicate if the GFCI is enabling power flow through the GFCI to the coupled device. In such an example, the first LED may illuminate a red color to represent that power is not flowing through the GFCI (i.e., the GFCI was tripped and requires a reset) and the second LED may illuminate a green color (e.g., power flow is moving through the power cord similar to a green traffic light), which can enable a user to quickly understand the state of the GFCI (e.g., active or tripped to prevent power flow). A GFCI may further include more or fewer LEDs that can be arranged variously on the GFCI and used to represent different information. For instance, a GFCI may include a LED positioned relative to a "test" and/or a "reset" button positioned on the GFCI to indicate whether at least an input side of the GFCI is obtaining power through the power cord. This may indicate whether or not the power cord is connected to an electrical outlet or another source.

Example power cords can also include other components that may operate separately from and/or part of an inline GFCI. For example, a GFCI may include a meter that can measure electric current through the GFCI. The meter may include a display that enables a user to view the current electric current measured by the meter.

Some example power cords presented herein may further include one or more communication interfaces. A communication interface may be coupled to a GFCI or another part of the power cord and may be used in various ways. The communication interface may be built as part of the GFCI or connected to the GFCI in another way and can communicate with other devices, such as smartphones, a remote designed for the power cord, and wearable technology. The communication interface may engage in wireless communication via a network and/or through near field communication (NFC).

The communication interface may be used to provide information to one or more remote devices. For instance, the communication interface may obtain usage information from a sensor on the power cord and relay the usage information to a remote device. Example usage information may include an indication regarding whether the power cord is plugged into an electrical source, whether one or more devices are obtaining electricity via the power cord, and/or the current flow rate through an inline GFCI. The usage information can also represent other information, such as a timer indicating how long a particular device has been coupled and receiving electricity through the power cord.

In another embodiment, the communication interface may enable remote control by a remote device. For instance, the communication interface may enable a remote device to control and cause an inline GFCI to prevent electrical power from flowing to a connected appliance. The remote device may also reset the inline GFCI to enable electrical power to resume flowing to the connected appliance. In some embodiments, each GFCI positioned inline of the power cord may include a communication interface that enables each GFCI to be controlled individually by the remote device. The communication interface may communicate with various types of devices, including smartphones, wearable computing devices, tablets, specialty devices, and vehicle-specific systems. The communication interface may use a web-based interface and/or application interface in some examples.

Referring to the Figures, FIG. 1 illustrates a power cord, according to one or more example embodiments. The power cord 100 includes portions 102, 104, 106, which are connected via a splitter 110. In other embodiments, the power cord 100 can have other configurations. For instance, the power cord may include additional portions configured to couple to more devices (e.g., connect 3 or more devices to an electrical source).

The power cord 100 represents an example configuration of an electrical cable capable of connecting one or more devices (e.g., appliances) to an electrical source, such as an electrical outlet, a battery, or a generator. As shown, the power cord 100 includes multiple GFCIs 112, 114, positioned inline to enable each GFCI 112, 114 to prevent the flow of electrical power to connected devices in situations where the GFCI senses an electrical fault. As such, the illustration shown in FIG. 1 represents one possible embodiment. In another embodiment, for example, the power cord 100 may not include the splitter and may include a single inline GFCI.

The portion 102 of the power cord 100 includes an end connector 108, which may connect the power cord 100 to the electrical source. In some examples, the end connector 108 is a plug configured to insert into an electrical outlet. In other examples, the connector 108 may couple to a source of electricity in another way. In addition, the portion 102 may include a GFCI in some implementations.

As shown in FIG. 1, the end of the portion 102 opposite to the connector 108 couples to the splitter 110. The splitter 110 may enable electricity traveling from the electrical source and through the portion 102 to be divided and supplied into the portions 104, 106. As such, the portions 104, 106 of the power cord 100 are similar in arrangement and extend from the splitter 110. Each portion 104, 106 further includes end connectors 116, 118, which are each configured to couple the power cord 100 to a device. For example, end connectors 116, 118 may serve as connecting outlets to enable the power cords of devices to be plugged in. Various types of splitters may be used within examples, such as pigtail connectors and wire connectors.

The portion 104 extends from the splitter 110 and includes inline GFCI 112 positioned between the splitter 110 and the end connector 116. As such, the portion 106 similarly extends from the splitter 110 and includes inline GFCI 114 positioned between the splitter 110 and the end connector 118.

Within examples, the materials making up the different components of the power cord 100 may differ. For instance, the materials can include rubber, plastics, copper, aluminum, and/or other types. In addition, the lengths of the different portions 102, 104, 106 can vary. For instance, in some examples, the portion 102 may be several meters long and may be much longer than the portions 104, 106. The lengths can differ and depend on the application for the power cord 100. In addition, the girth of the different portions can vary and may depend on the girth of the inner conductor. In some examples, the power cord 100 may include a stranded conductor, a semiconducting material, an insulation material, separator tape, armor, and a weather resistance PVC jacket. The power cord 100 can include multiple separated conductors in some examples.

In some embodiments, the power cord 104 may include a fourth portion that can couple to another device (e.g., a third device). In addition, the power cord 104 may also include a third GFCI coupled to the fourth portion between the first end and the second end of the fourth portion such that the GFCI is configured to control a flow of electricity through the fourth portion to the third device when the second end of the fourth portion is electrically coupled to the third device. Similarly, additional portions can be included to enable the power cord to supply electricity to power more than 3 devices simultaneously.

Figure 2:
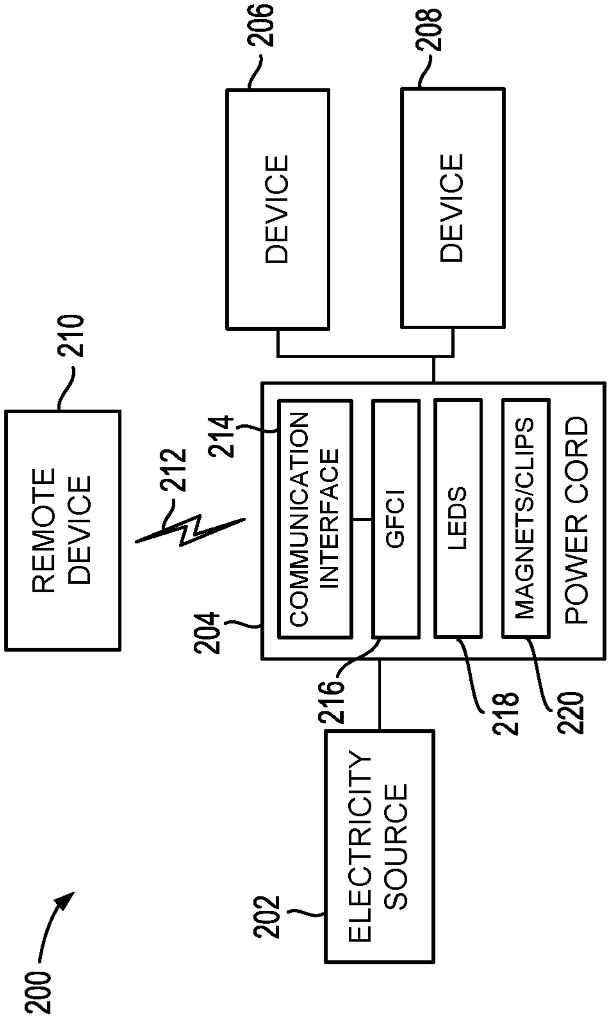
FIG. 2 is a block diagram of a system, according to one or more example embodiments.

FIG. 2 is a block diagram of a system, according to one or more example embodiments. The system 200 includes an electricity source 202, a power cord 204, devices 206, 208, and a remote device 210. In other examples, the system 200 may include more or fewer components in other arrangements.

The electricity source 202 may correspond to a wall outlet, battery source, a generator, or another type of electricity source 202. The electricity source 202 may supply 120 volts in some examples and 220-240 volts in other examples. Some wallet outlets may provide up to 5 Ampere (Amp) to devices while others may be power sockets configured to provide up to 15 Amp. The power cord 204 may couple to the electricity source 202 in various ways. For example, the power cord 204 may be implemented as the power cord 100 shown in FIG. 1 and coupled to the electricity source 202 via the connector 108. The size and configuration of the connector 108 can vary within examples. For instance, the connector 108 can depend on the region of intended use for the power cord 100.

The power cord 204 may be used to connect one or more devices to the electricity source 202. As shown in FIG. 2, the power cord 204 is shown connecting the devices 206, 208 to the electricity source. In such a configuration, the power cord 204 may simultaneously supply electricity from the electricity source 202 to both devices 206, 208. In some embodiments, the power cord 204 may include one or more restricting elements that can be used to limit power flow through the power cord 204 to one device at a time. For example, a GFCI may trip and stop power flow to a device after detecting that the device is no longer drawing the same amount of electric current.

In addition, the power cord 204 may include one or more inline GFCI 216. As indicated above, the GFCI 216 may detect an electrical fault and prevent the flow of electricity to devices 206, 208 as a result. In addition, the GFCI 216 may communicate with the remote device 210 through communication interface 214. Particularly, the status of one or more GFCIs can be transmitted to one or more remote devices. For instance, the power cord 204 can be connected to Wi-Fi or may include Bluetooth that enables information to be provided wirelessly to a smartphone that is using an application designed to show information for the power cord 204 (as well as other connected power cords). The communication interface 214 can also be used to communicate other information, such as sensor data collected via one or more sensors on the power cord 204.

The devices 206, 208 represent various types of devices capable of receiving electricity. For example, the devices 206, 208 can correspond to appliances, rechargeable batteries, etc. As such, the devices 206, 208 may be built as part of the power cord 204 or may be disconnected from the power cord 204.

The power cord 204 is shown in wireless communication 212 with the remote device 210. Particularly, the communication interface 214 of the power cord 204 may provide information to the remote device 210 via wireless communication 212. The communication interface 214 may be configured to engage in communication using one or more wireless communication technologies. For instance, the communication interface 214 may be configured to communicate via a wireless connection using, e.g., Internet, Bluetooth® radio technology, communication protocols described in IEEE 802.11 (including any IEEE 802.11 revisions), Cellular technology (such as GSM, CDMA, UMTS, EV-DO, WiMAX, LTE, or 5 G), or Zigbee® technology, among other possibilities. In some embodiments, the wireless communication involves near field wireless communication between the communication interface 214 and the remote device 210.

The communication interface 214 may provide information relating to the use of the power cord 204. For example, the communication interface 214 may provide an indication whether the power cord 204 is connected to the electricity source 202 and/or if one or both of devices 206, 208 are connected to the power cord 204. In some examples, the communication interface 214 may specify which device 206, 208, if any, is currently receiving electricity through power cord 204. In some instances, the communication interface 214 may be configured to provide usage information to the remote device 210 via wireless communication. The information may include an indication of a state of one or more GFCIs 216.

In addition, the communication interface 214 may be configured to receive remote control instructions via wireless communication 212 from the remote device 210. In an embodiment, the remote device 210 may correspond to a smart phone or wearable computing device that provides control instructions to the communication interface 214 via an application. In another embodiment, the remote device 210 may correspond to a specialized device configured to wirelessly control the power cord 204. The control instructions may include stopping the flow of electricity through the power cord 204 to one or both devices 206, 208. The remote device 210 may also receive current flow measurements from the communication interface 214 that indicate the rate of current flowing through the power cord 204.

In addition, the power cord 204 also includes LEDs 218. As indicated above, the LEDs 218 may be used to display power information to a user. For instance, the LEDs 218 may illuminate a certain color when the power cord 204 is connecting a device (e.g., the device 206) to the electricity source 202. As such, the status of the GFCI 216 can impact the status of one or more LEDs 218. For example, when a GFCI 216 is stopping power transfer from the electricity source 202 to the device 206, one LED may illuminate red to indicate that the device 206 is not receiving electricity. Conversely, the LED may illuminate a green light when the GFCI 216 enables power to flow from the electricity source 202 to the device 206. Multiple LEDs may be used within examples in various ways as further described herein.

In some embodiments, LEDs 218 may include a first LED configured to illuminate when the GFCI is preventing flow of electricity through the GFCI and a second LED configured to illuminate when the GFCI is enabling flow of electricity through the GFCI. These LEDs may illuminate different colors (e.g., red, green, etc.). In some instances, the first LED and the second LED are configured such that only the first LED or the second LED illuminates at a given time. In addition, each GFCI may further include a third LED positioned proximate to a reset button and a test button of the GFCI with the third LED configured to illuminate when the first end of the power cord is coupled to the electrical source.

In addition, the power cord 204 may also include magnets/clips 220, which can couple the power cord 204 to one or more surfaces. For instance, magnets/clips 220 may be used to connect power cord 204 to the side of a truck or another metallic surface. In some embodiments, magnets/clips 220 may include a set of magnets coupled to the power cord 204 with the set of magnets configured to couple the power cord to a metallic surface. In other embodiments, magnets/clips 220 may include a set of grips coupled to the power cord 204. For instance, the set of grips are configured to couple the power cord to a vehicle.

The magnets/clips 220 can differ in size and configuration. In addition, some implementations may include magnets or clips that can be removed from the power cord 204. In other examples, the magnets or clips may be permanently coupled to the power cord 204.

Figure 3:
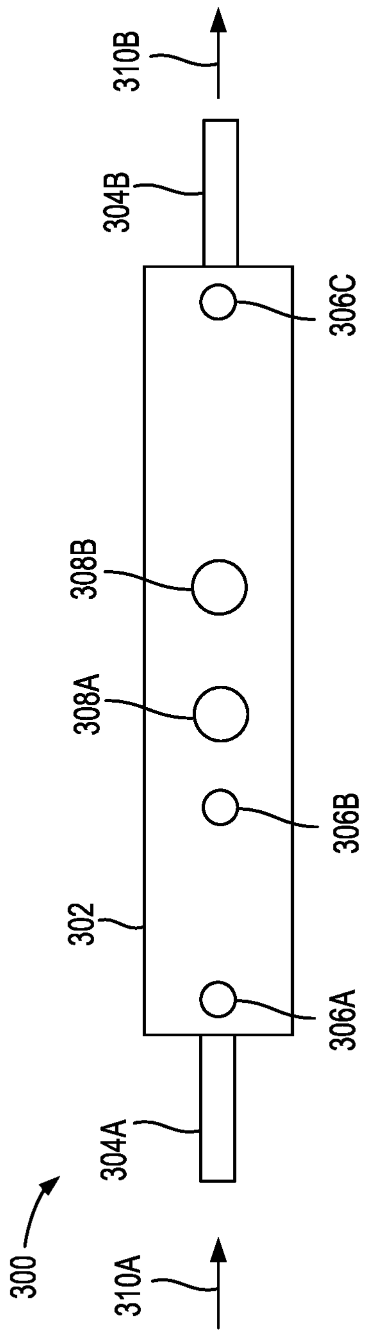
FIG. 3 illustrates a ground fault circuit interrupter, according to one or more example embodiments.

FIG. 3 illustrates a ground fault circuit interrupter, according to one or more example embodiments. The GFCI 300 may be part of a power cord, such as the power cord 100 shown in FIG. 1. As indicated above, a power cord may include one or more GFCIs to perform operations described herein. For example, the GFCI 300 can interrupt power delivery to an electrical load (e.g., devices 206, 208 shown in FIG. 2), such as when a ground leak is detected. The GFCI 300 can be configured to stop power to an electrical load having grounded portions of the load exposed to electrical current. By interrupting power to a device leaking current to ground, an individual who may come in contact with a grounded portion of the load will not receive a shock. In any case, once the faulty load has been disconnected, a reset button of the GFCI 300 may be activated to restore power to the receptacle. When activated, the test button simulates a ground leak to test the functionality of the GFCI 300.

As shown in FIG. 3, the GFCI 300 may include input line 304A, output line 304B, test 308A, reset 308B, and LEDs 306A, 306B, 306C. In other embodiments, the GFCI 300 may include more or fewer components in other arrangements. Input line 304A and output line 304B may correspond to a portion of a power cord that the GFCI 300 is coupled between. As such, electricity may flow into the GFCI 300 via input line 304A (as represented by arrow 310A), through the GFCI 300, and out via output line 304B (as represented by arrow 310B). For example, power from an electrical outlet may flow into the GFCI 300 via input line 304A and out of the GFCI 300 via output line 304B to a device coupled to the power cord.

Test 308A may represent a physical button that allows a user to test the power shut off function of the GFCI 300. Pushing the test 308A may cause the GFCI 300 to stop power flow between input line 304A and output line 304B. Reset 308B may be used to open the flow of power (i.e., reset the GFCI 300 to open) from input line 304A to output line 304B. In other examples, the GFCI 300 can include other buttons, less buttons, or no physical buttons at all.

LEDs 306A-306C can be used to communicate the state of the GFCI 300 and thus the current ability for power to flow through the GFCI 300. As an example, LED 306A may illuminate green when power is flowing through input line 304A (i.e., input line 304A is coupled to an electricity source). Similarly, LED 306C may illuminate green when power is flowing through output line 304B. LED 306B may illuminate to indicate a status of the GFCI 300 (e.g., when the GFCI is receiving power). As such, the LEDs 306A-306C may be installed in various ways to convey information. For example, LED 306C may illuminate red when the GFCI 300 is not letting power flow through to the output line 304B.

As further indicated, the GFCI 300 may also be remotely controlled. For instance, a remote device (e.g., the remote device 210 shown in FIG. 2) may cause the GFCI 300 to stop the flow of electricity via a signal provided through a wireless connection with the GFCI 300. In addition, the remote device may also cause the GFCI 300 to reset and allow power to resume flowing through the GFCI 300 (and through the power cord in general).

Figure 4:
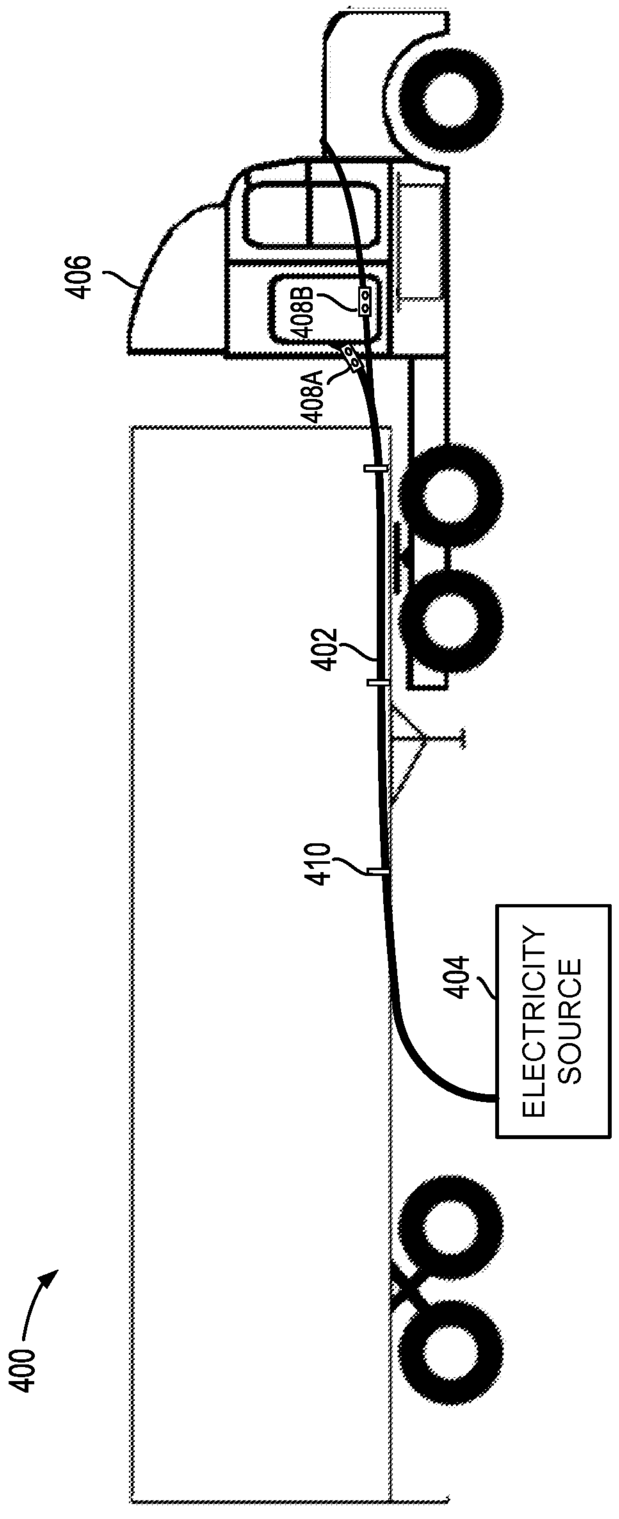
FIG. 4 illustrates a power cord supplying electricity to multiple components of a semi-truck, according to one or more example embodiments.

FIG. 4 illustrates a system for supplying electricity to multiple components of a semi-truck, according to one or more example embodiments. The system 400 involves using a power cord 402 to connect electricity source 404 to multiple components of the semi-truck 406, such as to a device within the cabin of the semi-truck 406 and also to a battery of the semi-truck 406. Although the system 400 illustrates a semi-truck, other types of vehicles and devices can use the power cord 402 to obtain power. Example vehicles can include cars, motorcycles, construction equipment, specialized vehicles, boats, planes, robots, electric lawn mowers, plows, and/or drones, etc. Example devices can include home and office devices/appliances, tools, batteries, computing devices, and cryptocurrency nodes and miners, among others.

The power cord 402 is connected to the electrical source 404, which may be an electrical outlet, battery, a generator, or another type of source. As further shown, the power cord 402 includes multiple GFCIs 408A, 408B, which may each shut off power to a particular portion of the semi-truck 406 beyond the splitter of the power cord 402. The power cord 402 further includes clips 410, which may couple the power cord securely to the bed and other components of the truck 406. The clips 410 may be magnetic and built as part of the power cord 402. In other embodiments, the clips 410 can have other forms.

In some embodiments, the truck driver or another user can communicate with the power cord 402 using a device, such as a smartphone. The communication can enable remote control and enable the user to view information related to the current performance of the power cord 402.

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A power cord for electrically connecting one or more devices to an electrical source comprising:

a first portion, wherein a first end of the first portion is configured to couple to the electrical source;

a splitter having an input and an output, wherein a second end of the first portion is coupled to the input of the splitter;

a second portion, wherein a first end of the second portion is coupled to the output of the splitter and a second end of the second portion is configured to electrically couple to a first device;

a third portion, wherein a first end of the third portion is coupled to the output of the splitter and a second end of the third portion is configured to electrically couple to a second device; and a set of ground fault circuit interrupters (GFCIs), wherein a first GFCI is coupled to the second portion between the first end and the second end of the second portion such that the first GFCI is configured to control a flow of electricity through the second portion to the first device when the second end of the second portion is electrically coupled to the first device, wherein a second GFCI is coupled to the third portion between the first end and the second end of the third portion such that the second GFCI is configured to control the flow of electricity through the third portion to the second device when the second end of the third portion is electrically coupled to the second device, and wherein each GFCI comprises a first LED configured to illuminate when the GFCI is preventing flow of electricity through the GFCI, a second LED configured to illuminate when the GFCI is enabling flow of electricity through the GFCI, and a third LED configured to illuminate when the first end of the first portion is coupled to the electrical source.

2. The power cord of claim 1, wherein the first LED is a first color and the second LED is a second color, and wherein the first color is different from the second color.

3. The power cord of claim 2, wherein the first color is red and the second color is green.

4. The power cord of claim 3, wherein the first LED and the second LED are configured such that only the first LED or the second LED illuminates at a given time.

5. The power cord of claim 4, wherein the third LED is positioned proximate to a reset button and a test button of the GFCI.

6. The power cord of claim 1, further comprising:

a communication interface configured to provide usage information to a remote device via wireless communication.

7. The power cord of claim 6, wherein the information includes an indication of a state of at least one GFCI of the set of GFCIs.

8. The power cord of claim 6, wherein the communication interface is further configured to enable the remote device to control at least one GFCI of the set of GFCIs.

9. The power cord of claim 6, wherein the wireless communication involves a connection via a network.

10. The power cord of claim 6, wherein the wireless communication involves near field wireless communication between the communication interface and the remote device.

11. The power cord of claim 1, further comprising:

a set of magnets coupled to the power cord, wherein the set of magnets are configured to couple the power cord to a metallic surface.

12. The power cord of claim 1, further comprising:

a set of grips coupled to the power cord, wherein the set of grips are configured to couple the power cord to a vehicle.

13. The power cord of claim 1, further comprising:

a fourth portion, wherein a first end of the fourth portion is coupled to the output of the splitter and a second end of the fourth portion is configured to electrically couple to a third device.

14. The power cord of claim 13, further comprising:

a third GFCI coupled to the fourth portion between the first end and the second end of the fourth portion such that the GFCI is configured to control a flow of electricity through the fourth portion to the third device when the second end of the fourth portion is electrically coupled to the third device.

15. An apparatus comprising:

a power cord having a first end and a second end, wherein the first end is configured to couple to an electrical source and the second end is configured to electrically couple to a device; and a ground fault circuit interrupter (GFCI), wherein the GFCI is coupled to the power cord between the first end and the second end such that the GFCI is configured to control a flow of electricity through the power cord to the device when the second end of the power cord is electrically coupled to the device, wherein the GFCI includes a set of light emitting diodes (LEDs), wherein a first LED is configured to illuminate when the GFCI is preventing the flow of electricity, wherein a second LED is configured to illuminate when an output side of the GFCI is outputting electricity, and wherein a third LED is configured to illuminate when the first end of the power cord is coupled to the electrical source.

16. The apparatus of claim 15, wherein the first LED and the second LED are coupled to the GFCI such that only the first LED or the second LED illuminates at a given time.

17. The apparatus of claim 15, wherein the third LED is positioned proximate to a reset button and a test button of the GFCI.

18. The apparatus of claim 15, wherein the GFCI further includes a communication interface, wherein the communication interface is configured to provide usage information to a remote device via wireless communication.

19. The apparatus of claim 15, further comprising:

a set of magnets coupled to the power cord, wherein the set of magnets are configured to couple the power cord to a metallic surface.

* * * * *